United States Patent [19]

Kawai

[11] Patent Number: 5,209,446
[45] Date of Patent: May 11, 1993

[54] ROTARY STAND

[75] Inventor: Makoto Kawai, Nagasaki, Japan

[73] Assignee: Mitsubishi Denki Kabushiki Kaisha, Tokyo, Japan

[21] Appl. No.: 835,389

[22] Filed: Feb. 14, 1992

[30] Foreign Application Priority Data

Feb. 18, 1991 [JP] Japan .................. 3-45905

[51] Int. Cl.⁵ ............................................. A47B 91/00
[52] U.S. Cl. .................... 248/349; 108/139;
  248/131; 248/133; 248/144; 248/183; 248/371;
  248/920; 248/923
[58] Field of Search ............. 248/371, 395, 131, 133,
  248/144, 349, 183, 178, 184, 185, 917, 919, 920,
  921, 922, 923; 108/139

[56] References Cited

U.S. PATENT DOCUMENTS

| 4,562,988 | 1/1986 | Bumgardner | 248/371 X |
| 4,564,166 | 1/1986 | Craft et al. | 248/183 X |
| 4,659,053 | 4/1987 | Holley et al. | 248/371 X |
| 4,738,422 | 4/1988 | Matheson et al. | 248/183 |
| 4,880,191 | 11/1989 | Lake, Jr. | 248/371 |
| 5,024,415 | 6/1991 | Purens | 248/371 X |

FOREIGN PATENT DOCUMENTS 59-147375 10/1984 Japan .
60-95767 6/1985 Japan .
62-118262 7/1987 Japan .

Primary Examiner—Ramon O. Ramirez
Attorney, Agent, or Firm—Burns, Doane, Swecker & Mathis

[57] ABSTRACT

A rotary stand having a base and a turntable connected in a slidable manner at their respective circular faces by a connecting member inserted into an axis and a spacer which has a projection fitted to the outer periphery of the axis inserted into an elongated hole of the turntable, so that the projection is restricted to turn within the elongated hole, while being permitted to turn only in a predetermined area within the guide groove of the base.

5 Claims, 8 Drawing Sheets

ROTARY STAND

BACKGROUND OF THE INVENTION

1. Field of the Invention

This invention relates to a rotary stand for a video display, a telephone set or the like to be turned in any direction.

2. Description of Related Art

FIG. 1 illustrates a perspective view of a conventional rotary stand of the type referred to above. In FIG. 1, a turntable 1 is placed on a base 2. A circular face 2a is provided at the base 2, with an axis 2b projecting at the central part of the circular face 2a. The axis 2b is inserted into an elongated hole 1b formed in the turntable 1. A circular face 1a is formed in the turntable 1 in a manner to cover the elongated hole 1b, the lower surface of which is slidably put on the circular face 2a of the base 2. The circular faces 1a, 2a are held in tight contact with each other approximately all over the surfaces thereof as indicated in a cross sectional view of FIG. 2.

A cylindrical spacer 4 is fitted to the outer periphery of the axis 2b inserted into the elongated hole 1b, and has a flange portion 4a covering an upper edge of the elongated hole 1b. An axis part of a cylindrical stopper 3 with a flange portion 3a which covers the flange portion 4a is fitted into a central hole of the axis 2b within the spacer 4. The turntable 1 and base 2 are coupled by a screw 5 and a nut 6. The screw 5 is inserted into the stopper 3 and the central hole of the axis 2b from the upper right, and the nut 6 can be screwed to the screw 5 in the central hole of the axis 2b from the lower surface of the base 2.

The conventional rotary stand in the aforementioned structure will be used in a manner as will be depicted below. In the first place, the turntable 1 is placed onto the base 2 as the axis 2b is put into the elongated hole 1b, and the spacer 4 is fitted into between the outer periphery of the axis 2b and the elongated hole 1b. Moreover, the stopper 3 is inserted into an upper end of the central hole of the axis 2b. Finally, the base 2 is coupled with the turntable 1 by the screw 5 and the nut 6 thrust into an end part of the screw 5. If the nut and screw 5, 6 are screwed by a proper amount, the position of the circular faces 1a, 2a is optionally selected to achieve sliding contact therebetween. In other words, the circular face 1a becomes slidable to the circular face 2a in the whole 360° area in the horizontal direction, and at the same time, in the vertical direction by the length of the elongated hole 1b. Accordingly, the turntable 1 is made possible to turn on the base 2 in the above area of the horizontal direction and able to sway in the above restricted range of the vertical direction.

An applied example of FIG. 1 is shown in FIG. 3. In the applied example, a head of a stopper 3A is formed rhombic. Moreover, a pair of ribs 20 are provided projecting at both sides of the elongated hole 1b, as indicated in FIG. 3(a). When the turntable 1 is turned in the horizontal direction on the base 2 as shown in FIGS. 3(b) and 3(c), a corner of the rhombic stopper 3A butts against one of the ribs 20, whereby the horizontal turn of the turntable 1 is restricted.

FIGS. 4 and 5 show the other example of the conventional rotary stand with a turn restricting mechanism, in which reference numerals 7-9 represent an upper table, a rotating table and a base, respectively. A circular recess 9a is formed at an upper surface of the base 9 to accommodate the rotating table 8. A stopper element 8a provided at the lower surface of the rotating table 8 is inserted into a circular guide groove 9b of fixed length at the bottom of the recess 9a. The rotating table 8 is turned while inserted into the recess 9a. A central hole 8c passes through the central part of a curved face 8b at the upper surface of the rotating table 8. A curved face 7b is formed at the lower surface of the upper table 7 in such a shape as to be slidable to the curved face 8b. An axis 7c projecting at a fixed plate 7a mounted onto the upper table 7 at a part corresponding to the curved face 7b is inserted inside the central hole 8c of the rotating table 8. A screw 10 is forced into the axis 7c via an assistant plate 10a at the lower surface of the base 9. The three members, i.e., upper table 7, rotating table 8 and base 9 are integrally coupled by this screw 10.

According to the above conventional example, the upper table 7 and rotating table 8 are held in contact with each other at the respective curved faces 7b, 8b, so that the upper table 7 is made slidable on the rotating table 8. Therefore, the upper table 7 is possible to sway in a vertical direction. On the other hand, the rotating table 8 is possible to turn around the axis 7c within the recess 9a of the base 9 in the range allowing the stopper element 8a to move in the guide groove 9b, that is, in the range allowing the stopper element 8a to butt against both ends of the guide groove 9b.

Because of the above-discussed structure of the conventional rotary stands, it is impossible in the case of FIGS. 1, 2 to control the turning amount of the turntable 1 to the base 2. If a function to control the turning amount is provided for the rotary stand of FIGS. 1, 2, the swaying angle of the turntable 1 in the vertical direction might be disadvantageously limited.

In the meantime, although it is possible in FIG. 3 to control the turning angle of the turntable 1 by making the corner of the rhombic stopper 3A hit the rib 20, the axis 2b, rib 20 or stopper 3A may be broken if the turntable 1 is turned with a large force.

Further, since the fundamental parts of the rotary stand shown in FIGS. 4, 5 are separated into three pieces, namely, upper table 7, rotating table 8 and base 9, the structure is undesirably bulky in size and complicated, thus inviting an increase of costs.

A similar example of the rotary stands in the structure as above is revealed in Japanese Utility Model Application Laid-Open No. 59-147375 (1984) as well.

SUMMARY OF THE INVENTION

One object of this invention is to provide a rotary stand capable of turning a turntable freely and smoothly within a restricted area.

A further object of this invention is to provide a rotary stand not restricting a turntable to sway in a vertical direction within a restricted area.

A still further object of this invention is to provide a rotary stand realizing the aforementioned functions in a simple and inexpensive constitution.

A rotary stand of this invention is provided with a spacer which is outfitted to an axis inserted into an elongated hole of a turntable and has a projection to be restricted to turn within the elongated hole of the turntable, while being permitted to turn only in a predetermined area within a guide groove of a base. The base and turntable of the rotary stand are connected with each other by a connecting member inserted through the spacer and axis to be slidable at the respective circular faces.

Since the base and turntable are kept in slidable contact with each other at their circular faces, the turntable becomes possible to sway in a vertical direction of the base to an extent whereby both ends of the elongated hole are brought in touch with the spacer. Moreover, the spacer becomes possible to turn in a horizontal direction within the predetermined area of the guide groove by the projection, while it is restricted to turn in the elongated hole. Therefore, the horizontal rotation of the turntable to the base can be controlled in a prearranged range.

The above and further objects and features of the invention will more fully be apparent from the following detailed description with accompanying drawings.

DESCRIPTION OF THE PREFERRED EMBODIMENTS

A preferred embodiment of this invention will be depicted in detail hereinbelow with reference to the accompanying drawings.

Figure 1:
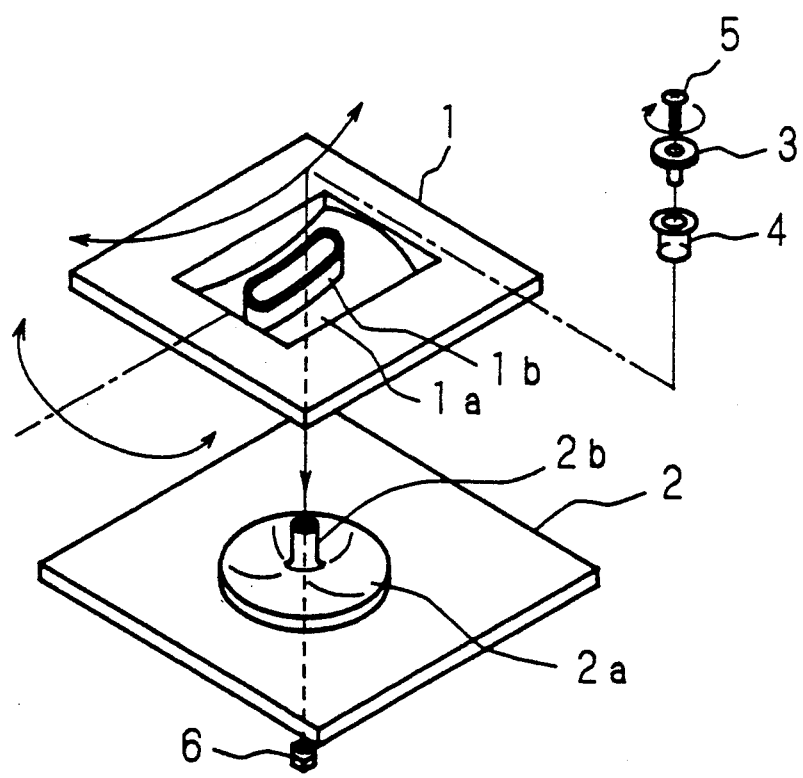
FIG. 1 is a perspective assembly view of a conventional rotary stand.
Figure 2:
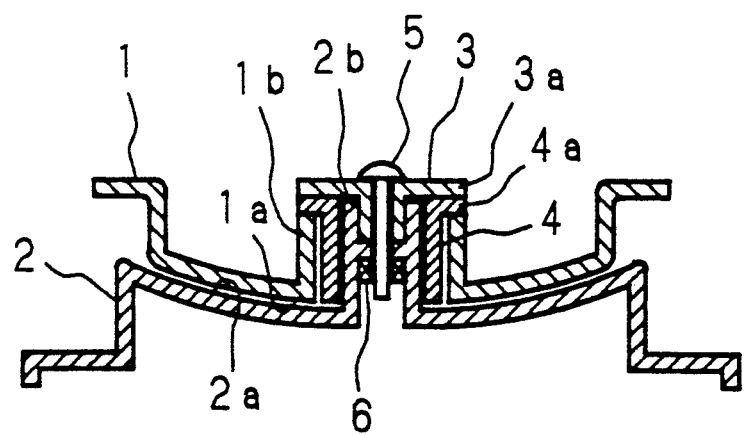
FIG. 2 is a longitudinal cross sectional view of the rotary stand of FIG. 1.
Figure 3A:
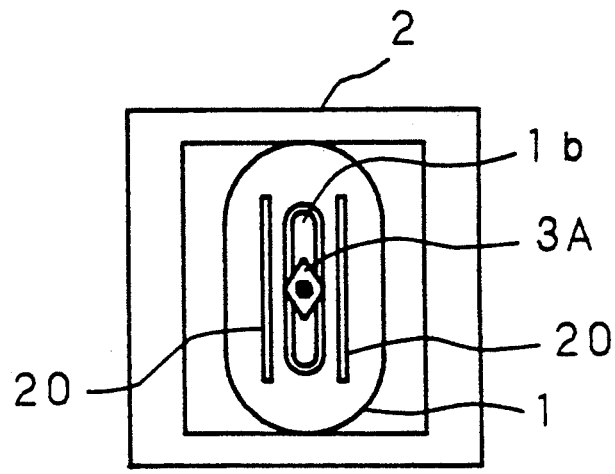
FIG. 3 is a top plan view of another example of the rotary stand of FIG. 1.
Figure 3B:
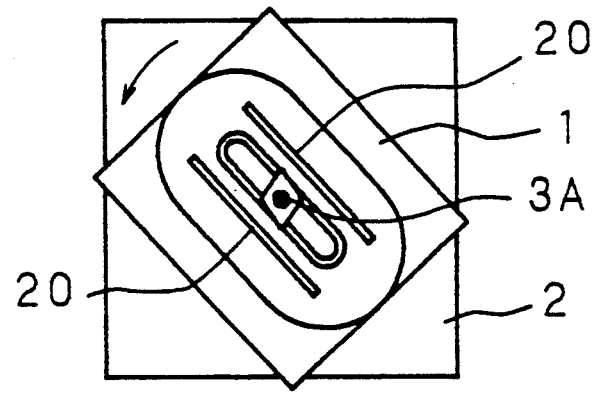
Figure 3C:
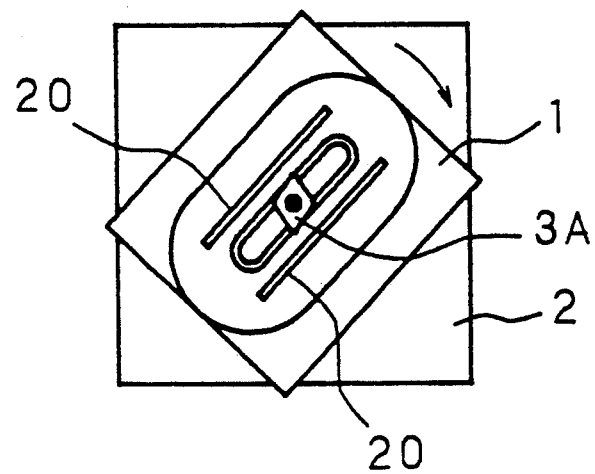
Figure 4:
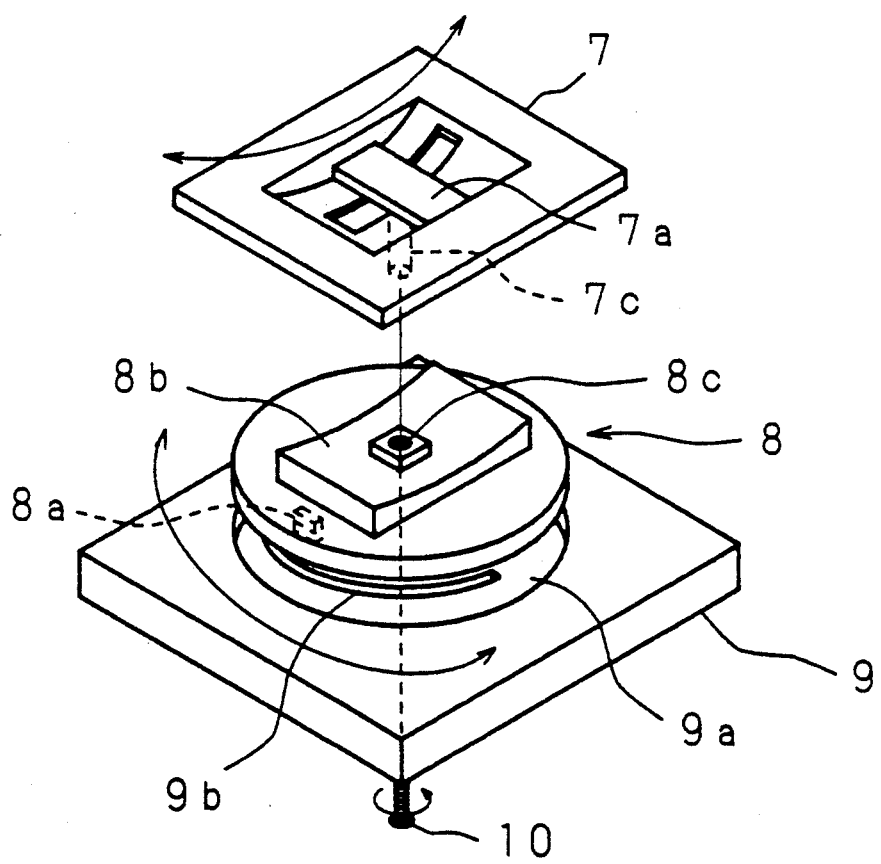
FIG. 4 is a perspective assembly view of another conventional rotary stand.
Figure 5:
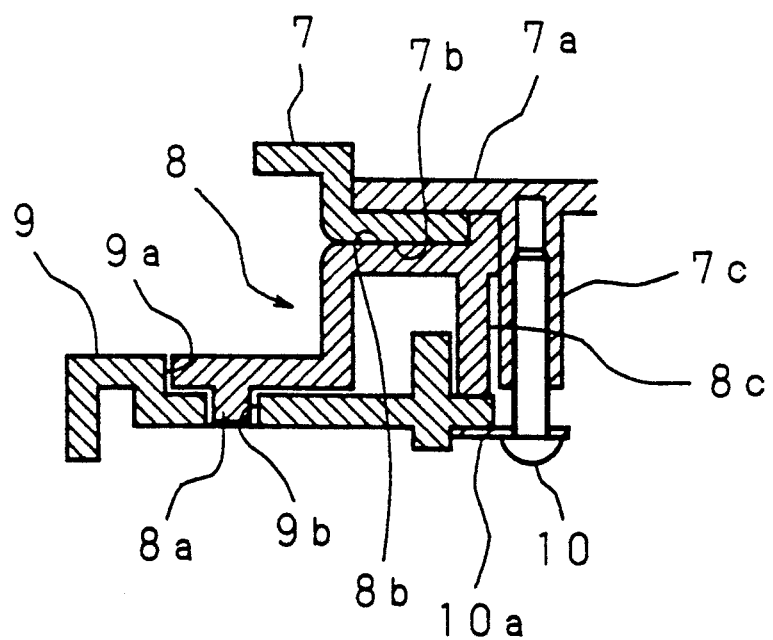
FIG. 5 is a longitudinal cross sectional view of an essential part of the rotary stand of FIG. 4.
Figure 6:
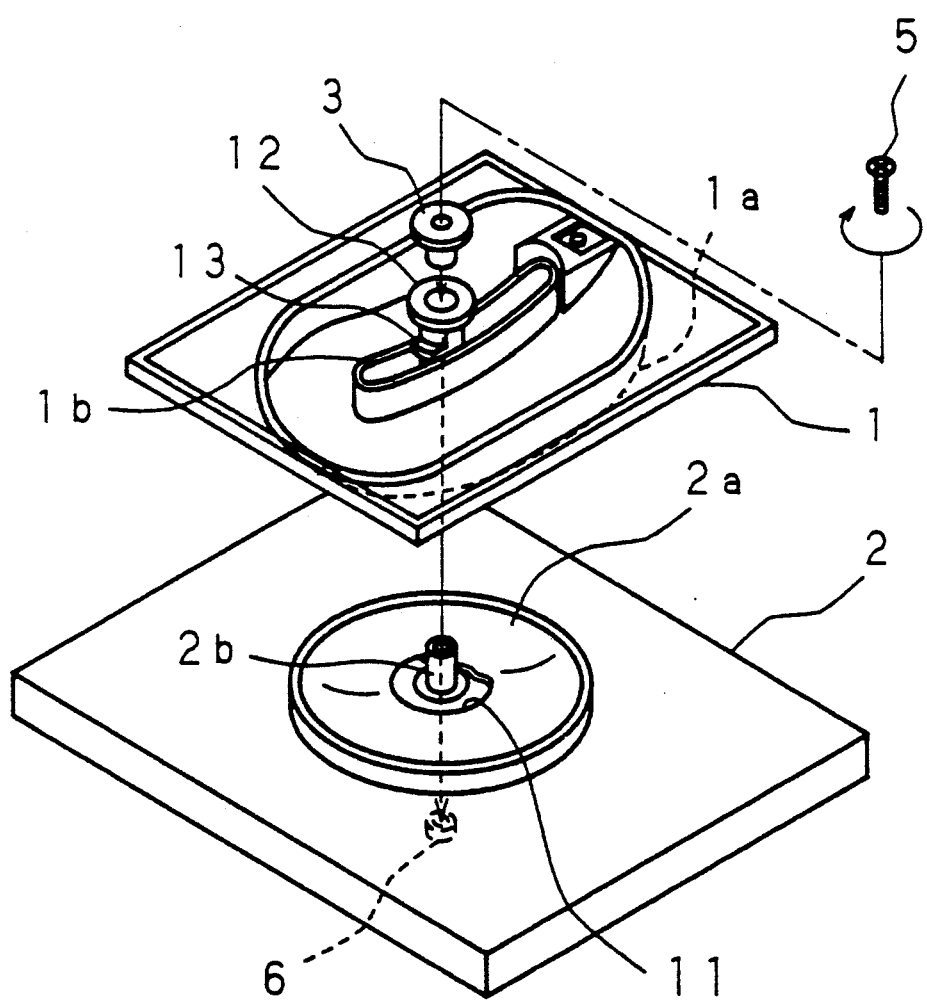
FIG. 6 is a perspective assembly view of a rotary stand of this invention.

FIG. 6 is a perspective view of a rotary stand according to one preferred embodiment of this invention, in which reference numerals 1, 2 denote a turntable and a base for mounting the turntable thereon, respectively. A circular face 2a is provided at the base 2, with an axis 2b projecting at the central part of the circular face 2a. The axis 2b is inserted into an elongated hole 1b formed in the turntable 1. A circular face 1a is formed in the turntable 1 in a manner to cover the elongated hole 1b, the lower surface of which is slidably put on the circular face 2a of the base 2. An axis part of a cylindrical stopper 3 is inserted into a central hole of the axis 2b. The turntable 1 and base 2 are coupled by a screw 5 and a nut 6. The screw 5 is inserted into the stopper 3 and the central hole of the axis 2b from the upper right, while the nut 6 can be screwed to the screw 5 in the central hole of the axis 2b from the lower surface of the base 2. The parts of FIG. 6 with the same reference numerals as in FIG. 1 are equivalent to those of the conventional rotary stand.

Figure 7:
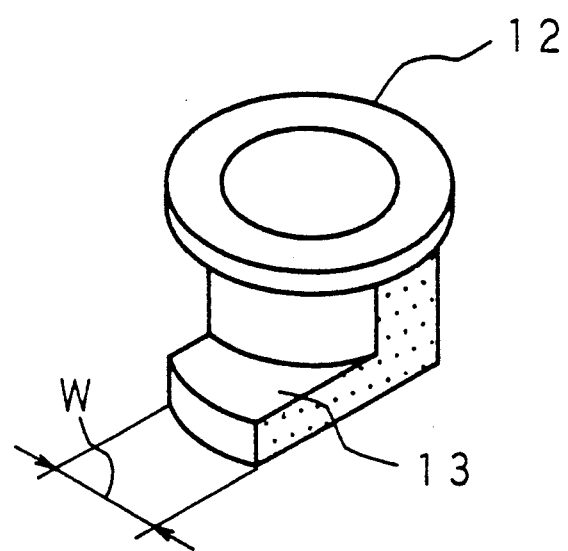
FIG. 7 is a perspective view of a spacer of the rotary stand of FIG. 6.

A guide groove 11 is formed in an area of predetermined angles in a horizontal direction of the circular face 2a. A spacer 12 as shown in FIG. 7 is positioned to be inserted into the elongated hole 1b. The width W of the spacer 12 is equal to or slightly smaller than the width of the elongated hole 1b. The spacer 12 has a projection 13 integrally formed therewith and a lower part of the projection 13 is fitted into the guide groove 11 on the circular face 2a.

The operation of this rotary stand will be discussed now.

The turntable 1 is placed onto the base 2 as the axis 2b is put into the elongated hole 1b, and the spacer 12 is fitted between the outer periphery of the axis 2b and the elongated hole 1b. At this time, the spacer 12 is positioned so that the projection 13 is directed in a longitudinal direction of the elongated hole 1b. Then, the stopper 3 is inserted into an upper end of the axis 2b and the screw 5 is forced into the stopper 3, spacer 12 and central hole of the axis 2b from above the stopper 3. Finally, the base 2 is coupled with the turntable 1 by screwing the nut 6 to a lower end of the screw 5 from the lower face of the base 2.

Figure 8A:
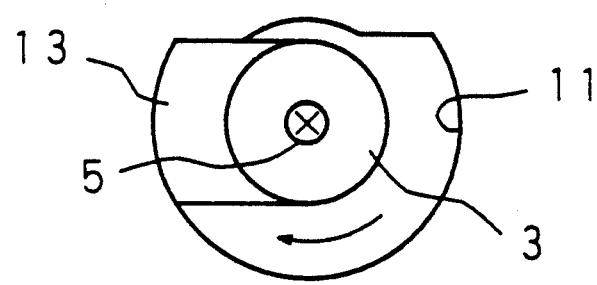
FIG. 8 is a view of explanatory of the relation between a projection and a guide groove in the rotary stand of FIG. 6.
Figure 8B:
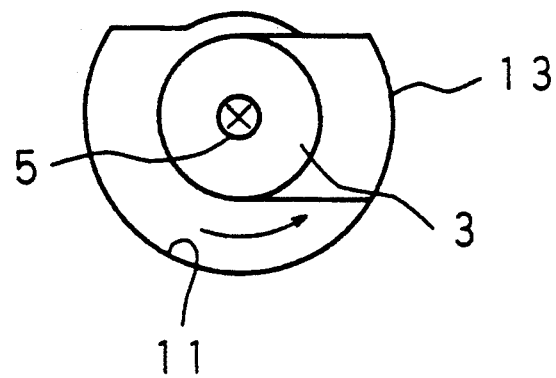

If the nut 6 is screwed to the screw 5 by a proper amount, the turntable 1 can be swayed in a vertical direction of the base 2 in the range allowing the spacer 12 to move against the elongated hole 1b while the circular faces 1a, 2a are sliding in contact with each other. Moreover, when the turntable 1 is turned in a horizontal direction on the base 2, since the movement of the the spacer 12 is restricted by the projection 13 in the width of the elongated hole 1b, the spacer 12 is turned in the same direction as the turntable 1. The turning amount of the spacer 12 at this time is, as indicated in FIGS. 8(a), 8(b), controlled by both ends of the guide groove 11, thereby prohibiting the further turn of the turntable 1. FIGS. 8(a), 8(b) represent the cases where the rotation of the spacer 12 is prohibited to 90° to the left and to the right, respectively. It is to be noted here that the angle is optionally set to be not larger than or not smaller than 90°.

According to the above embodiment, the swaying angle of the turntable 1 in the vertical direction is not limited by the turning angle thereof, and at the same time, the strength of the projection 13 and guide groove 11 is sufficiently secured. If a spacer without the projection 13 is used in place of the spacer 12, a rotary stand of the same structure as the conventional one is achieved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A rotary stand, comprising:
   a base having a circular face, an axis projecting on said circular face, and a guide groove formed in a predetermined area of said circular face in the periphery of said axis;
   a turntable having an elongated hole to which said axis is inserted, and another circular face mounted on said circular face;
   a spacer being outfitted to said axis inserted into said elongated hole and having a projection which is restricted to turn within said elongated hole and is allowed to turn in said predetermined area within said guide groove; and
   a connecting member for connecting said base and turntable in a manner that said base and turntable become slidable at said respective circular faces.

2. A rotary stand as set forth in claim 1, wherein each of said axis and spacer has a coaxial through hole.

3. A rotary stand as set forth in claim 2, wherein said connecting member is inserted into said through hole.

4. A rotary stand as set forth in claim 3, wherein said connecting member has a screw and a nut screwed to said screw.

5. A rotary stand as set forth in claim 1, wherein said predetermined area has the central angle of approximately 180° from the center of said axis.

* * * * *